United States Patent
Atsumi et al.

(10) Patent No.: US 7,474,494 B2
(45) Date of Patent: Jan. 6, 2009

(54) MAGNETIC DISK DEVICE WITH POSITIONING CONTROL

(75) Inventors: Takenori Atsumi, Ibaraki (JP); Atsushi Okuyama, Kanagawa (JP); Shinsuke Nakagawa, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/475,384

(22) Filed: Jun. 26, 2006

(65) Prior Publication Data

US 2006/0291088 A1 Dec. 28, 2006

(30) Foreign Application Priority Data

Jun. 24, 2005 (JP) ............................. 2005-184600

(51) Int. Cl.
*G11B 5/596* (2006.01)
(52) U.S. Cl. ................................. 360/77.08; 360/77.02
(58) Field of Classification Search ........................ None
See application file for complete search history.

(56) References Cited

U.S. PATENT DOCUMENTS

| 5,325,247 A * | 6/1994 | Ehrlich et al. | 360/78.09 |
| 2002/0012189 A1 * | 1/2002 | Ikai | 360/77.02 |
| 2003/0214749 A1 * | 11/2003 | Atsumi | 360/77.08 |

FOREIGN PATENT DOCUMENTS

JP 08-126370 5/1996

* cited by examiner

*Primary Examiner*—Andrew L. Sniezek
(74) *Attorney, Agent, or Firm*—Townsend and Townsend and Crew LLP; Patrick Duncan (57) ABSTRACT

In a magnetic disk device, oscillation occurring at a frequency higher than Nyquist frequency is suppressed. In one embodiment, a multi-late filter having a resonance point at a frequency higher than the intended Nyquist frequency is introduced in a previous stage of a controlled object. At that time, since a resonance characteristic of the multi-rate filter is aliased by a sampler, the multi-rate filter is designed such that the resonance point after the aliasing is stabilized in phase by a following compensator.

10 Claims, 12 Drawing Sheets

MAGNETIC DISK DEVICE WITH POSITIONING CONTROL

CROSS-REFERENCES TO RELATED APPLICATIONS

This application claims priority from Japanese Patent Application No. JP2005-184600, filed Jun. 24, 2005, the entire disclosure of which is incorporated herein by reference.

BACKGROUND OF THE INVENTION

The present invention relates to a magnetic disk device, which is particularly preferable for a disk device that performs positioning control of a controlled object including a magnetic head.

A magnetic disk device as an external storage device of a computer performs recording and reproduction of data by using a magnetic head that follows a target track on a disk surface. In such a head positioning control system, a sample value control system is used, in which head position information is read from a surface of a disk at every predetermined sampling time, and a digital controller controls a head position in every sampling.

In such a method, oscillation in a frequency region higher than the Nyquist frequency is observed as oscillation having different frequency components due to aliasing. Therefore, oscillation occurring in the frequency region higher than the Nyquist frequency deteriorates positioning accuracy; in addition, it causes the control system to be unstable at a frequency involving aliasing.

For such a problem, JP-A-8-126370 (Patent Document 1) discloses a control system design method using multi-rate hold in which frequency of output of a notch filter is set to be integral multiples of sampling frequency. The method disclosed in the Patent Document 1 is a method for preventing a phenomenon that mechanical resonance occurring at a higher frequency than the Nyquist frequency is excited by the control system.

BRIEF SUMMARY OF THE INVENTION

The method of the Patent Document 1 removes a frequency component that is the same as in the oscillation at a higher frequency than the Nyquist frequency from a control signal, but cannot actually reduce oscillation amplitude of the magnetic head. Therefore, when a position of the head is oscillated at a frequency higher than the Nyquist frequency, the oscillation is not suppressed by the method of the Patent Document 1, and positioning accuracy is still in a deteriorated condition.

A feature of the invention is to obtain a magnetic disk device that can suppress the oscillation occurring at the higher frequency than the Nyquist frequency.

One aspect of the invention is directed to a magnetic disk device that is configured to include a magnetic disk having a magnetic disk surface on which a position signal is written, a magnetic head for reading the position signal written on the magnetic disk surface, a sampler for sampling the position signal read by the magnetic head at every sampling time, an actuator for actuating the magnetic head, and a controller that controls the magnetic head to situate at a target position based on a given target position signal and the position signal sampled by the sampler; wherein the controller has a resonance point at which gain is increased at a higher frequency than the Nyquist frequency determined by the sampling time of the sampler.

One specific example of a configuration of the invention is described as follows.

(1) The controller realizes the resonance point using a multi-rate digital filter operating at a sampling time integral times less than the above sampling time.

(2) An open-loop transfer characteristic of a control system expressed using the same sampling time as that of the sampler has a resonance characteristic at a frequency at which frequency of the resonance point is aliased by the sampler for sampling the position signal, and a vector locus drawn by the resonance characteristic is a locus in a direction away from an unstable point on a Nyquist diagram.

(3) The controller generates a differential signal between the target position signal and the position signal as a certain signal using a following compensator and inputs the signal into the multi-rate digital filter.

(4) The following compensator provides a primary integral characteristic such that steady-state deviation does not occur even if an external force is exerted on the control system; provides a primary phase-lead characteristic that realizes a phase margin of 20 to 40 degrees; and provides a gain characteristic such that the device has a gain margin of 3 to 10 dB, and crossover frequency at gain of 0 dB in the open-loop transfer characteristic of the control system has a set value.

According to the invention, a magnetic disk device that can suppress the oscillation occurring at the frequency higher than the Nyquist frequency can be obtained.

DETAILED DESCRIPTION OF THE INVENTION

An embodiment of the invention will be described using drawings.

Figure 1:
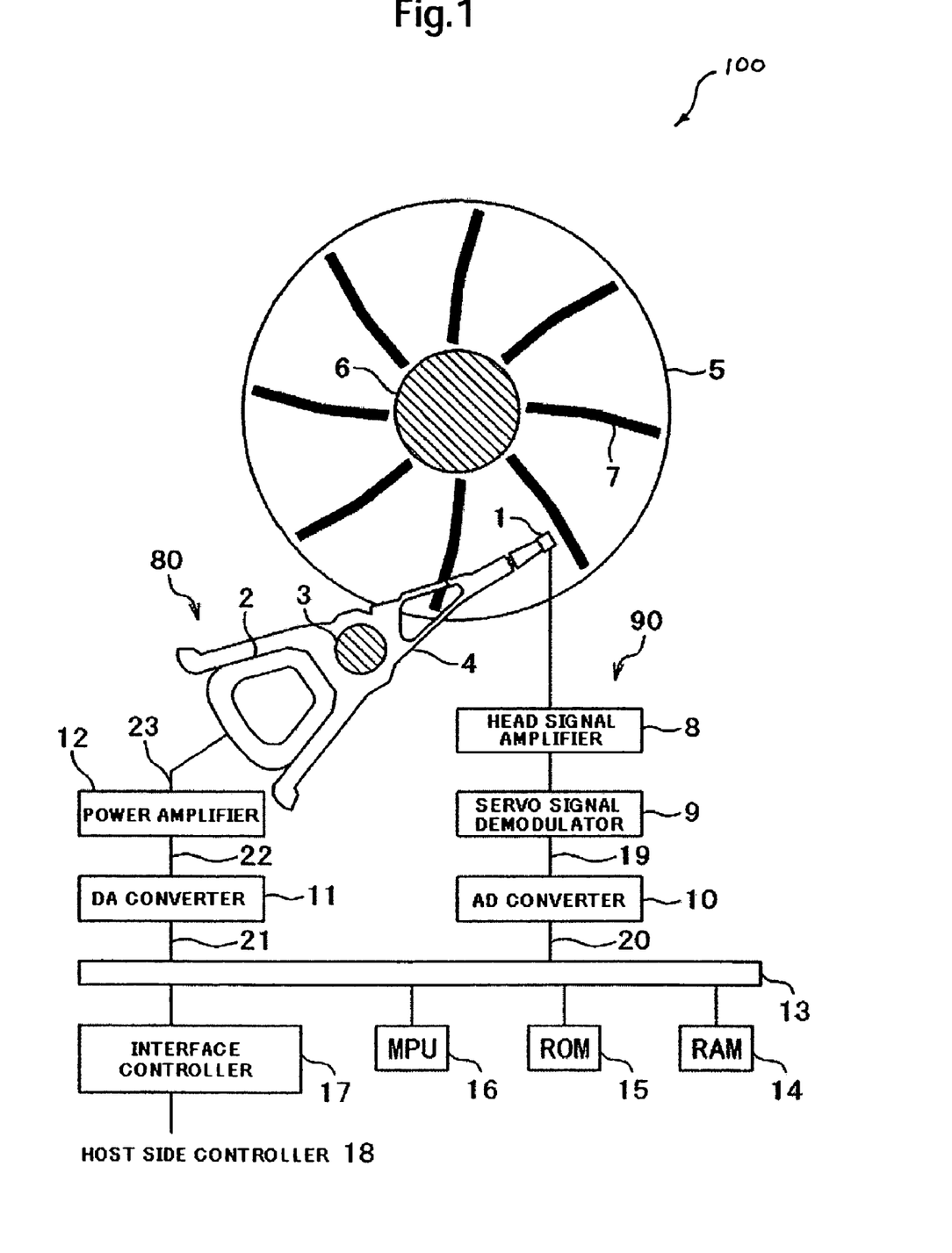
FIG. 1 is a block diagram of a magnetic disk device showing an embodiment of the invention.

First, description is made on a general configuration of a magnetic disk device 100 of the embodiment with reference to FIG. 1. FIG. 1 is a block diagram of the magnetic disk device 100 of the embodiment.

The magnetic disk device 100 is configured to have a magnetic disk 5, spindle motor 6, pivot bearing 3, carriage 4, voice coil motor 2, magnetic head 1, and positioning control system 90.

The magnetic disk 5 is a disk-like recording medium for recording information, and has servo sectors 7 in which servo information including position information and the like is recorded at a certain position in each track. The spindle motor 6 is disposed at the center of the magnetic disk 5 for rotating the magnetic disk 5 at a determined rotation frequency. The pivot bearing 3 is disposed radially outside the magnetic disk 5, and provided such that an axis of the pivot bearing 3 is parallel to an axis of the spindle motor. The carriage 4 is fixed to the pivot bearing 3, and can be oscillated with the pivot bearing 3. The voice coil motor (VCM) 2 drives the carriage 4, and oscillates the carriage 4 with the pivot bearing 3 as a center. The magnetic head 1 is fixed to a tip of the carriage 4, and moved in a radial direction on a surface of the magnetic disk 5 by oscillation of the carriage 4 until it reaches a target track on which the head follows the track to perform recording and reproduction of data and detect a position signal recorded in the servo sector 7 on the magnetic disk so that a present position can be known. Power for moving the magnetic head 1 is generated by the voice coil motor 2. The carriage 4 and the VCM 2 form an actuator 80 for the magnetic head 1.

The positioning control system 90 is connected to the magnetic head 1 and the VCM 2, and receives a servo signal including the position signal and the like from the magnetic head 1, and provides a VCM control signal 23 to the VCM 2. The positioning control system 90 is configured to have a head signal amplifier 8 connected to the magnetic head 1 through a signal line; a servo signal demodulator 9 connected to the head signal amplifier 8; an AD converter 10 connected to the servo signal demodulator 9; a bus 13 connected to the AD converter 10; RAM 14, ROM 15, MPU 16, and an interface controller 17 connected to the bus 13; a DA converter 11 connected to the bus 13 at an input side and connected to a power amplifier 12 at an output side; and the power amplifier 12 connected to the DA converter 11 at an input side and connected to the VCM 2 at an output side.

The servo information including the position information recorded in the servo sector 7 on the magnetic disk 5 is detected by the magnetic head 1, amplified by the head signal amplifier 8, and demodulated by the servo signal demodulator 9. The demodulated servo signal 19 is digitalized by the AD converter 10. The digitalized servo signal also includes a position signal 20. The position signal 20 obtained in this way is loaded into the MPU 16 as a controller via the bus 13.

The ROM 15 and the RAM 14 are connected to the MPU 16 via the bus 13. The ROM 15 stores various control programs executed by the MPU 16, and stores parameters necessary for various types of control. Moreover, the interface controller 17 is connected to the MPU 16 via the bus 13, and makes access request of recording and reproduction to the MPU 16 in response to a command from a host side controller 18. When a command of requesting recording and reproduction of data is issued, the MPU 16 executes a program for positioning control stored in the ROM 15 to obtain a distance to the target position from the input position signal 20, consequently generates an optimum VCM control signal 21 according to the moving distance. The generated VCM control signal 21 is formed into a power amplifier control signal 22 via the DA converter 11, and then converted into current 23 via the power amplifier 12, and then applied to the VCM 2 as an operation signal. Thus, the magnetic head 1 is positioned at a target position of the magnetic disk 5.

In the above, an operation method has been described on the positioning control system 90 in the embodiment. The invention relates to positioning in which the VCM control signal 21 is generated based on the difference between the present position and the target position. The positioning control according to the embodiment is described in detail below.

Figure 2:
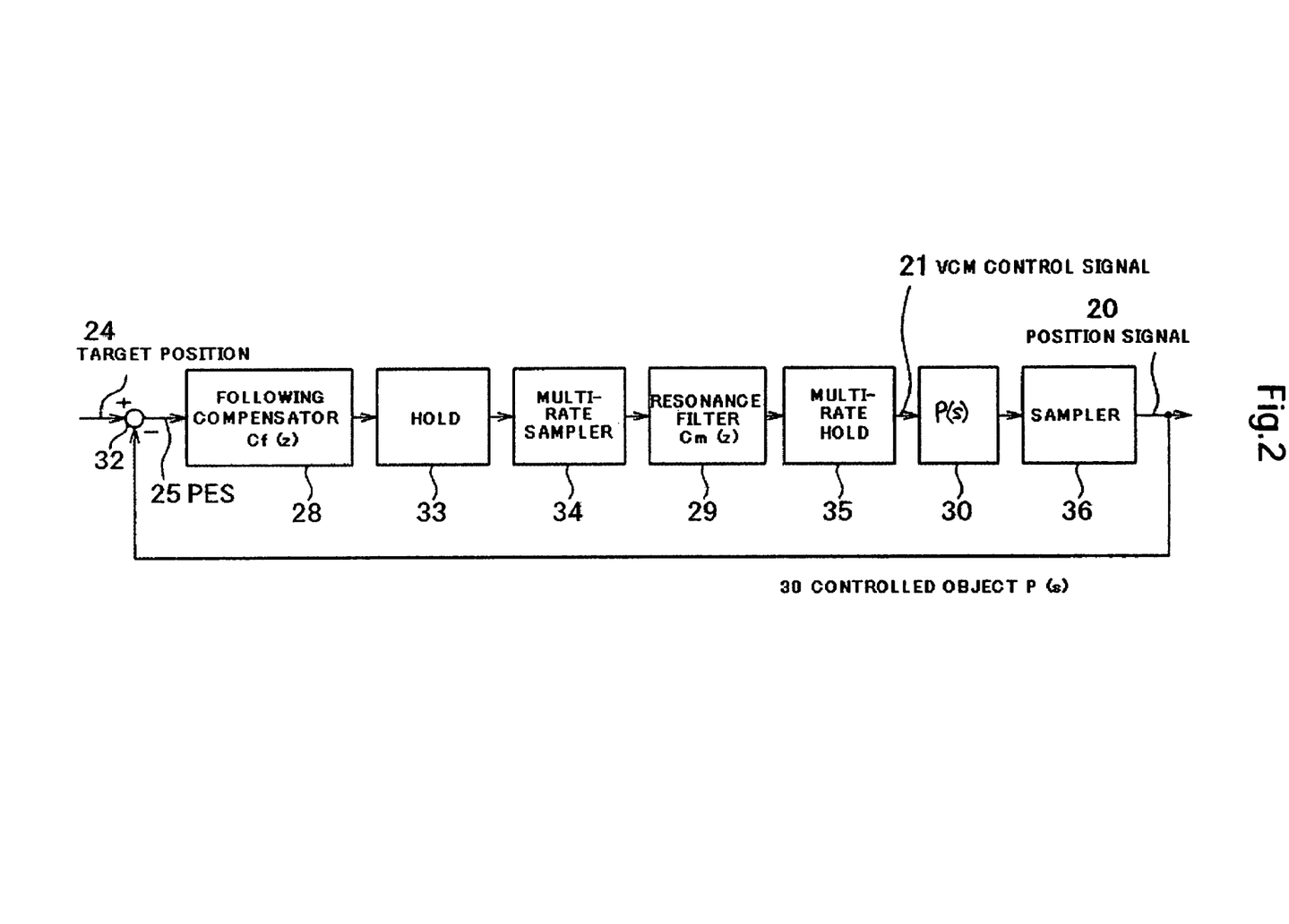
FIG. 2 is a block diagram of a positioning control system of the magnetic disk device of FIG. 1.

FIG. 2 is a block diagram of the position control system of the embodiment according to a mathematical formula model. For description, a mathematical formula model 30 of a controlled object is expressed by P(s). Here, the controlled object covers the output 22 of the DA converter 11 to the input 19 of the AD converter 10, and the transfer function P(s) expresses input and output characteristics of the object.

A following control system is mainly configured by a resonance filter 29 (a transfer function is denoted by Cm(z)) for realizing a resonance characteristic having a stable phase condition, and a following compensator 28 (a transfer function is denoted by Cf(z)) for realizing a desired control performance.

Hereinafter, description is made along a flow of a signal in FIG. 2. PES (position error signal) 25 that is a differential signal between a target position signal 24 and a position signal 20 is generated by an error detector 32. The PES 25 is inputted into the following compensator Cf(z) 28. The following compensator 28 generates a certain signal and outputs the signal. Sampling time of the following compensator Cf(z) 28 is Ts. Output of the following compensator Cf(z) 28 is passed through a hold 33 having a sampling time of Ts, and then inputted into a multi-rate sampler 34 having a sampling time of Ts/n (n is an integer). In the embodiment, n is 2.

A signal sampled by the multi-rate sampler 34 becomes input into the resonance filter Cm(z) 29. Sampling time of the resonance filter Cm(z) 29 is Ts/n. A multi-rate hold 35 is a D/A converter having a sampling time of Ts/n, and converts output of the resonance filter Cm(z) 29, which is a discrete time signal, into a continuous time signal. In the embodiment, both of the hold 33 and the multi-rate hold 34 are assumed to have a zero-order hold characteristic.

The following compensator Cf(z) 28 is set to have the following characteristic. That is, it provides a primary integral characteristic such that steady-state deviation does not occur even if an external force is exerted on the control system; provides a primary phase-lead characteristic that realizes a phase margin of 20 to 40 degrees; and provides a gain characteristic such that the device typically has a gain margin of 3 to 10 dB, and the crossover frequency at gain of 0 dB (frequency at which amplitude ratio between input and output is 1) in an open-loop transfer characteristic of the control system has a set value.

The resonance filter Cm(z) 29 of the embodiment is a multi-rate digital filter having a resonance point at a target frequency Ft for improving positioning accuracy. Parameters of the resonance filter Cm(z) 29 are designed such that when a characteristic of the resonance filter Cm(z) 29 and the controlled object P(s) which have been coupled in series and discretized using the sampling time Ts is assumed to be P2(z), a vector locus of a resonance characteristic due to the resonance filter Cm(z) 29 appearing on an open-loop characteristic P2(z)·Cf(z) draws a circular locus in a direction away from coordinates (−1,0) that represent an unstable point on the Nyquist diagram.

An example of a design method of a control system for improving positioning accuracy at a particular frequency according to the embodiment is described with numeric examples. In the embodiment, the controlled object P(s) 30 is assumed to be a mechanistic model expressed by the following equation (mathematical formula 1) which includes a rigid-body mode.

$$P(s) = \frac{1}{s^2} \quad \text{[Mathematical Equation 1]}$$

Figure 3:
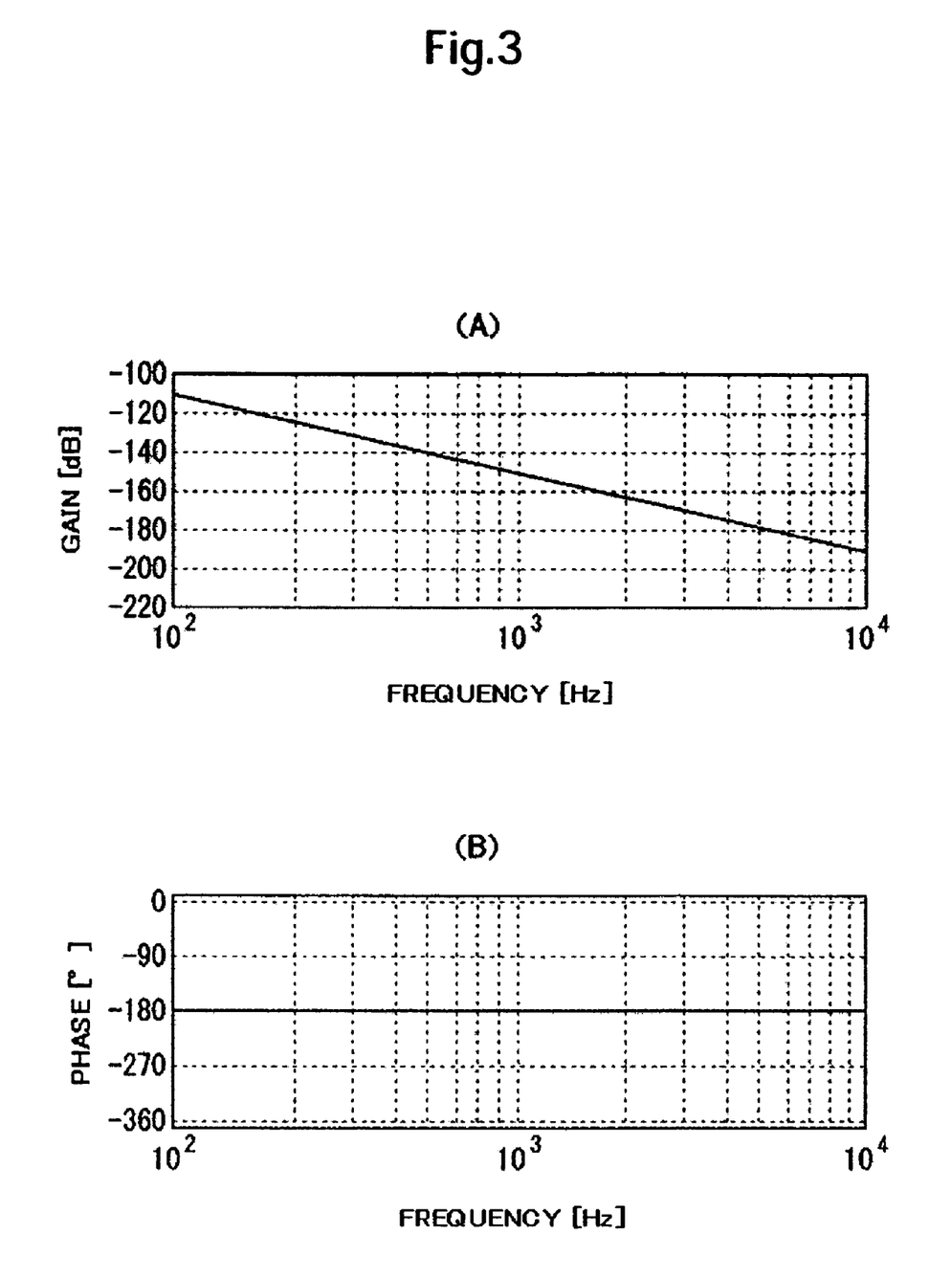
FIG. 3A and FIG. 3B are diagrams showing frequency response of a controlled object in the embodiment.
Figure 4:
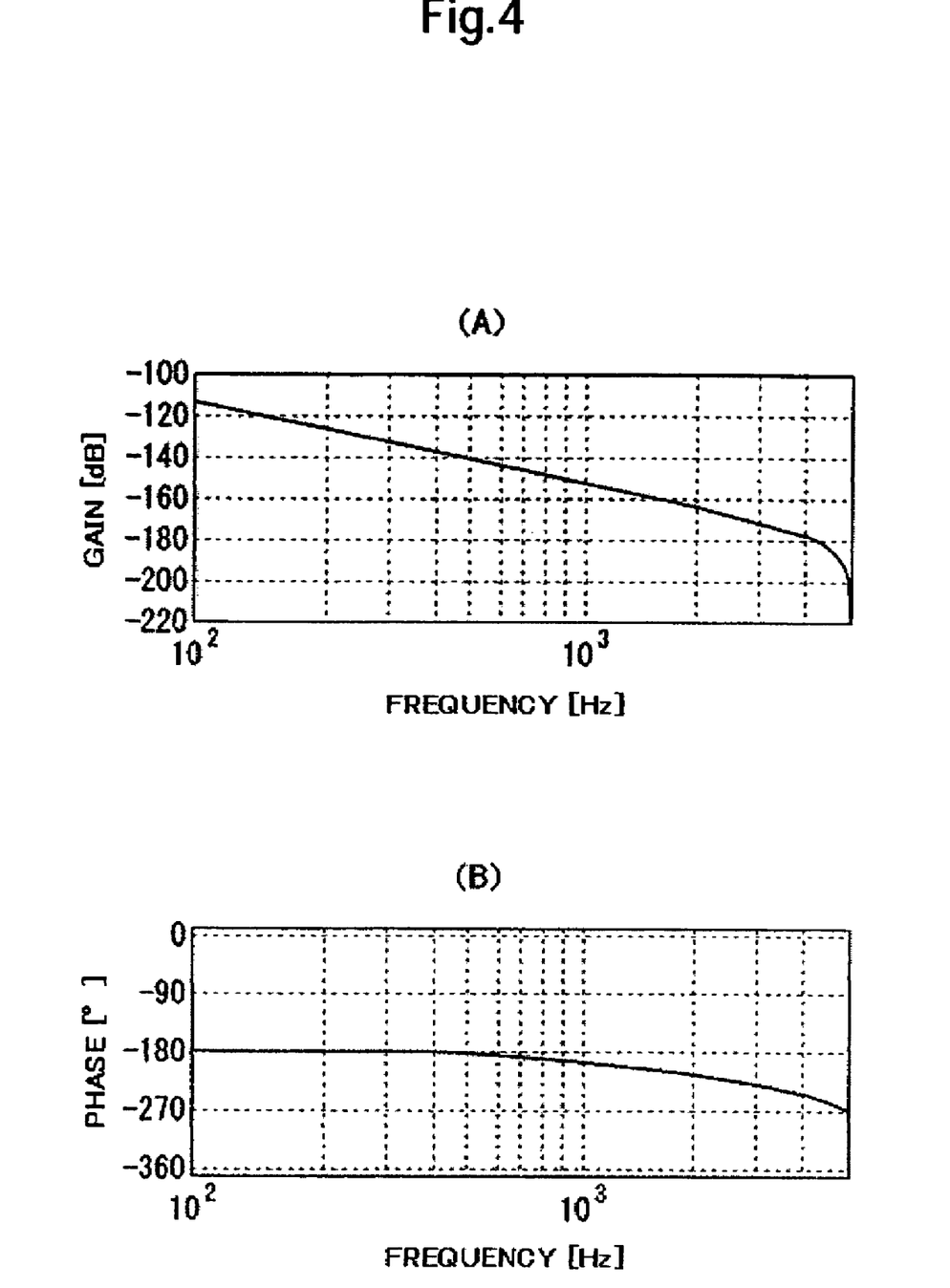
FIG. 4A and FIG. 4B are diagrams showing frequency response after discretizing the controlled object in the embodiment using zero-order hold of sampling time.

At that time, sampling time Ts is assumed to be 100 μs. Here, a transfer characteristic of the controlled object P(s) that is discretized using zero-order hold of the sampling time Ts is assumed to be P(z). Frequency response of the controlled object P(s) is shown in FIG. 3A to FIG. 3B. FIG. 3A shows a gain characteristic in the response, and FIG. 3B shows a phase characteristic in the response. Frequency response of the transfer characteristic P(z) is shown in FIG. 4A to FIG. 4B. FIG. 4A shows a gain characteristic in the response, and FIG. 4B shows a phase characteristic in the response.

The following compensator Cf(z) was designed as expressed by the following equation (mathematical formula 2) such that the crossover frequency at gain of 0 dB in the open-loop transfer characteristic is 1 kHz.

$$Cf(z) = 5.816 \times 10^7 \cdot \frac{z^3 - 0.764z^2 - 0.986z + 0.778}{z^3 - 0.387z^2 - 0.519z + 0.094} \quad \text{[Mathematical Equation 2]}$$

Figure 5:
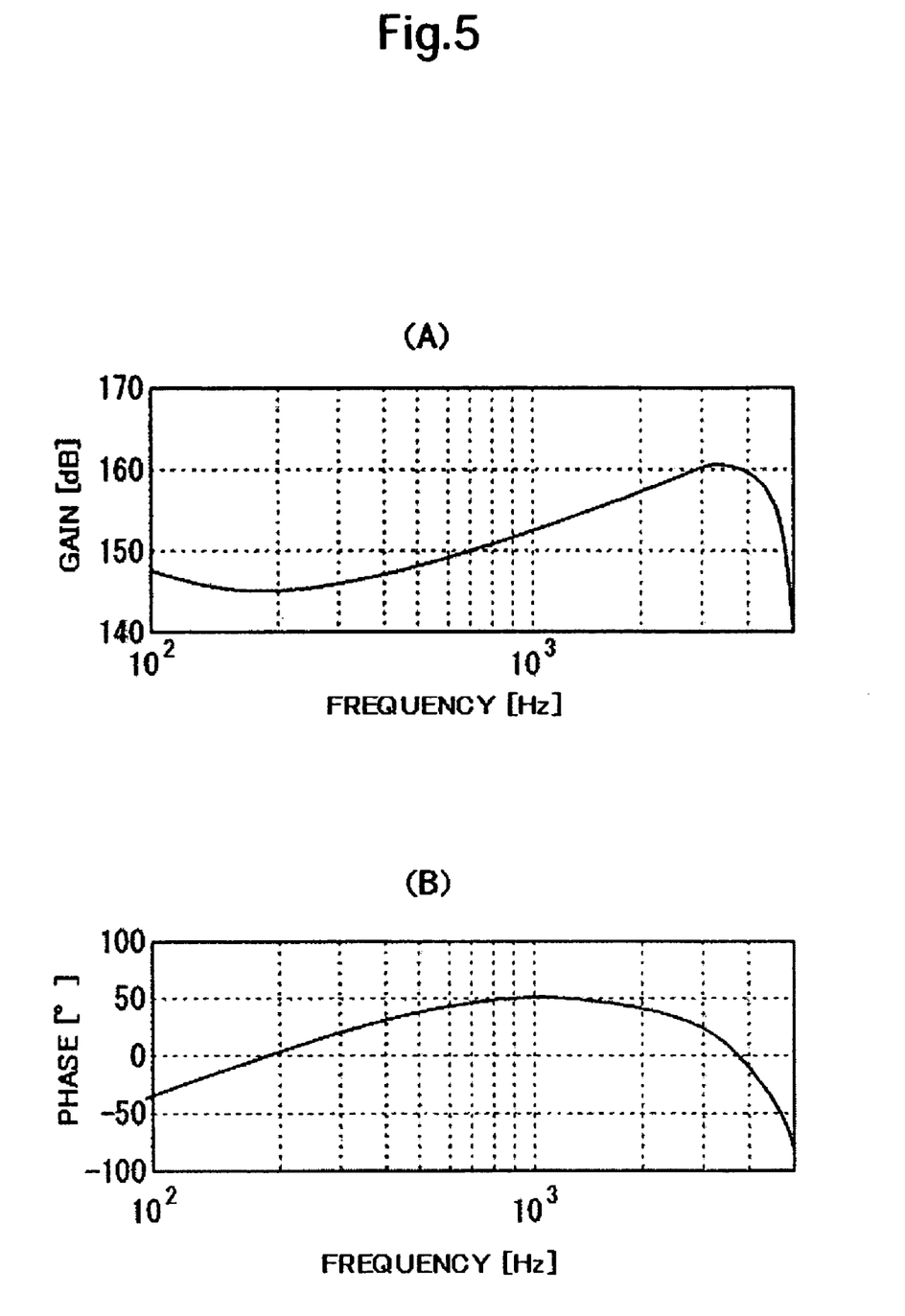
FIG. 5A and FIG. 5B are diagrams showing frequency response of a following compensator used in the embodiment.
Figure 6:
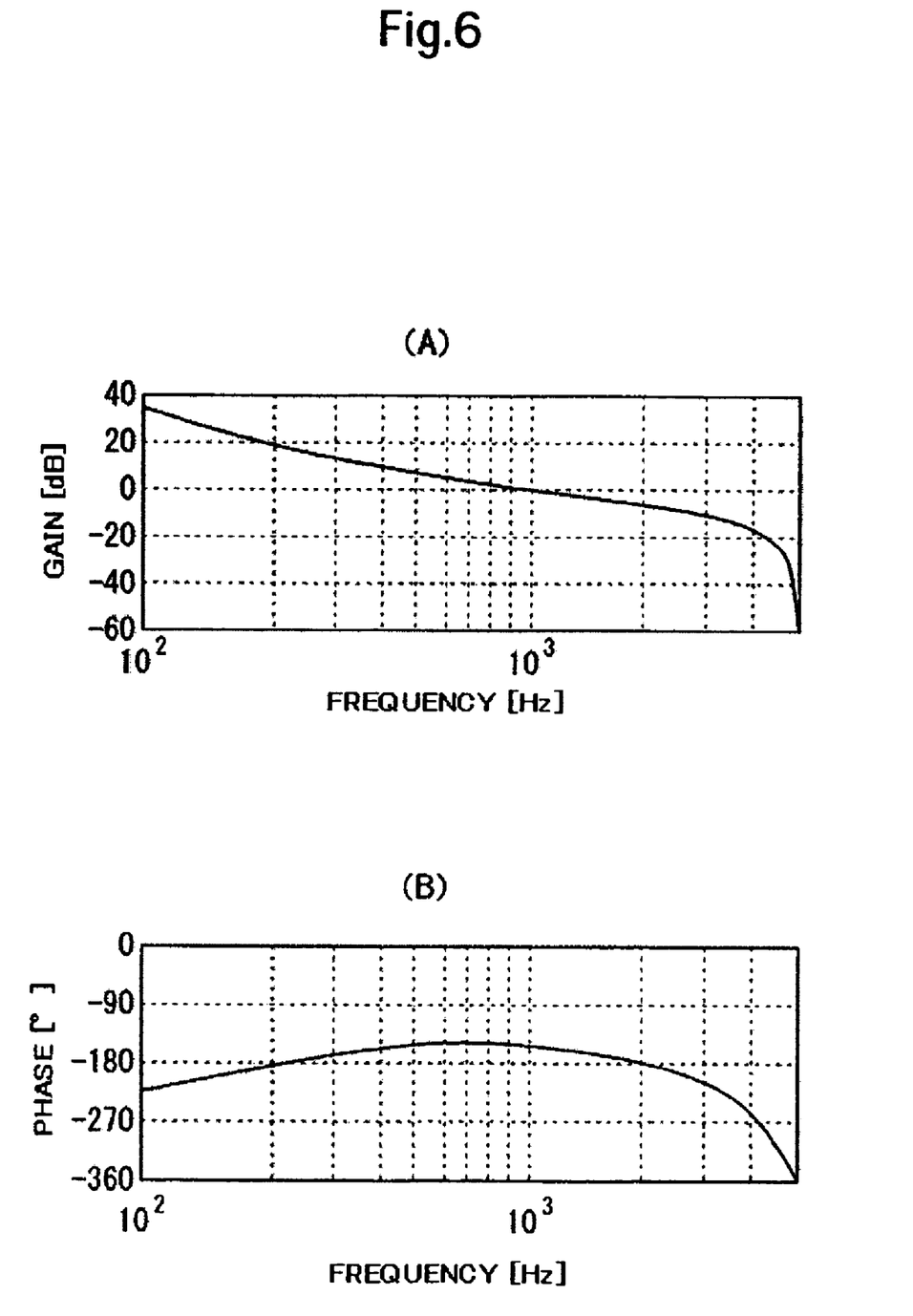
FIG. 6A and FIG. 6B are diagrams showing frequency response of an open-loop transfer characteristic in the case that the invention is not used.

Frequency response of the following compensator Cf(z) is shown in FIG. 5A to FIG. 5B. FIG. 5A is a gain characteristic in the response, and FIG. 5B is a phase characteristic in the response. Frequency response of P(z)·Cf(z), which is an open-loop transfer characteristic in a case that the resonance filter is not provided, is shown in FIG. 6A to FIG. 6B. FIG. 6A is a gain characteristic in the response, and FIG. 6B is a phase characteristic in the response.

Frequency at which positioning accuracy is improved by the resonance filter Cm(z) 29 is set to be 7 kHz. In the embodiment, since sampling time Ts of controlled variable is 100 μs, Nyquist frequency is 5 kHz, and frequency at which oscillation in 7 kHz is folded by aliasing is 3 kHz. Coordinates of a vector locus of an open-loop transfer characteristic P(z)·Cf(z) at 3 kHz which is the frequency involving aliasing are (−0.182, 0.161), and when the coordinates are assumed to represent a start point, a phase of a vector directing oppositely from an unstable point (−1, 0) is −348.83 degrees (in the case of normalizing the phase to be −360° to 0 degrees).

This shows that P2(z)·Cf(z) that is the open-loop transfer characteristic in the case of using the resonance filter Cm(z) 29, the phase at the resonance point that is present at 3 kHz can be near 37.3 degrees. In the embodiment, the resonance filter Cm(z) 29, in which the resonance point lies at 7 kHz, and the phase of the resonance point at 3 kHz is near 37.3 degrees in the open-loop transfer characteristic P2(z)·Cf(z), was designed as expressed by the following equation (mathematical formula 3).

$$C_m(z) = \frac{0.836z^3 + 1.856z^2 + 0.723z + 0.359}{z^3 - 1.364z^2 - 1.214z + 0.196} \quad \text{[Mathematical Equation 3]}$$

Figure 7:
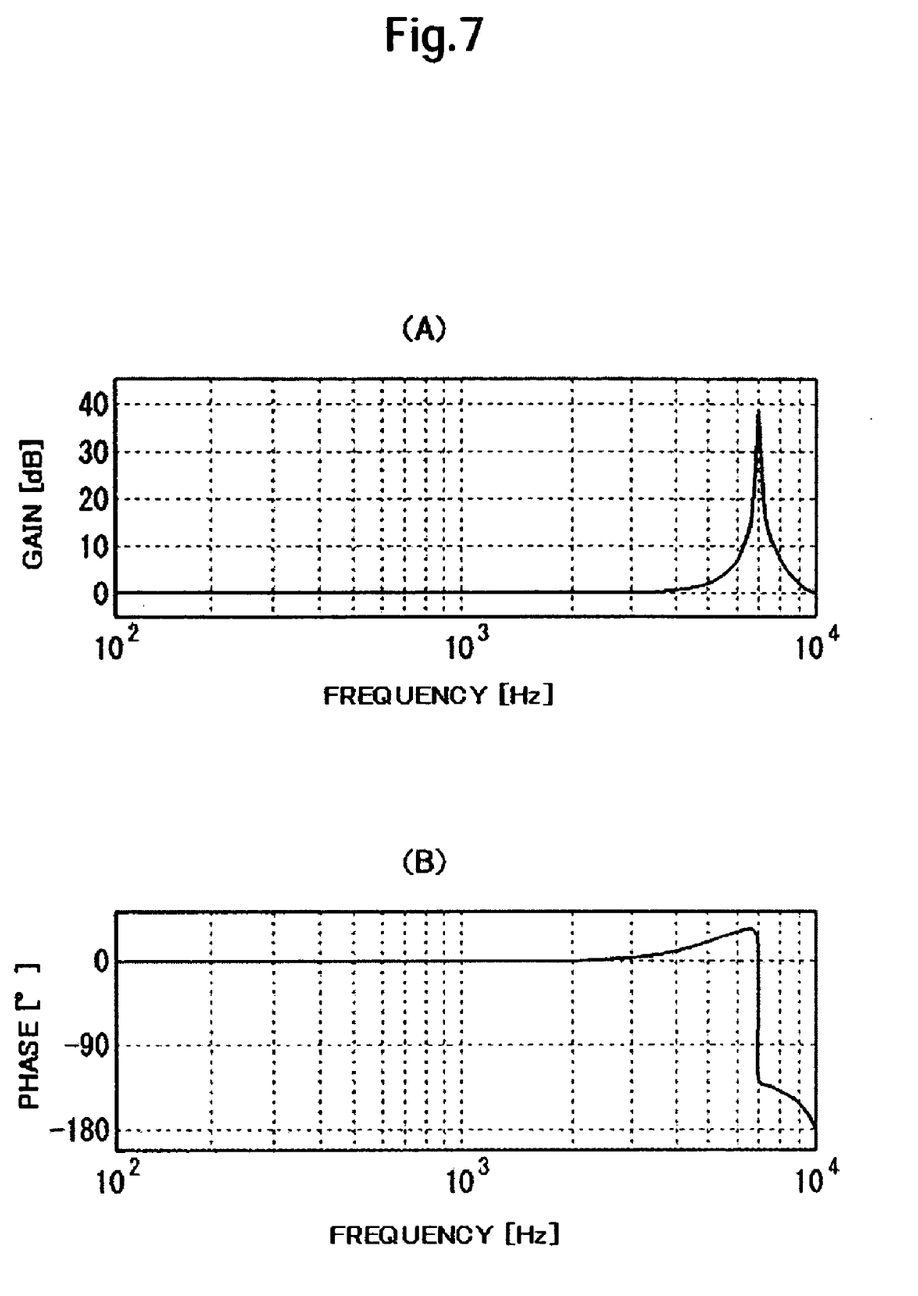
FIG. 7A and FIG. 7B are diagrams showing frequency response of a resonance filter used in the embodiment.
Figure 8:
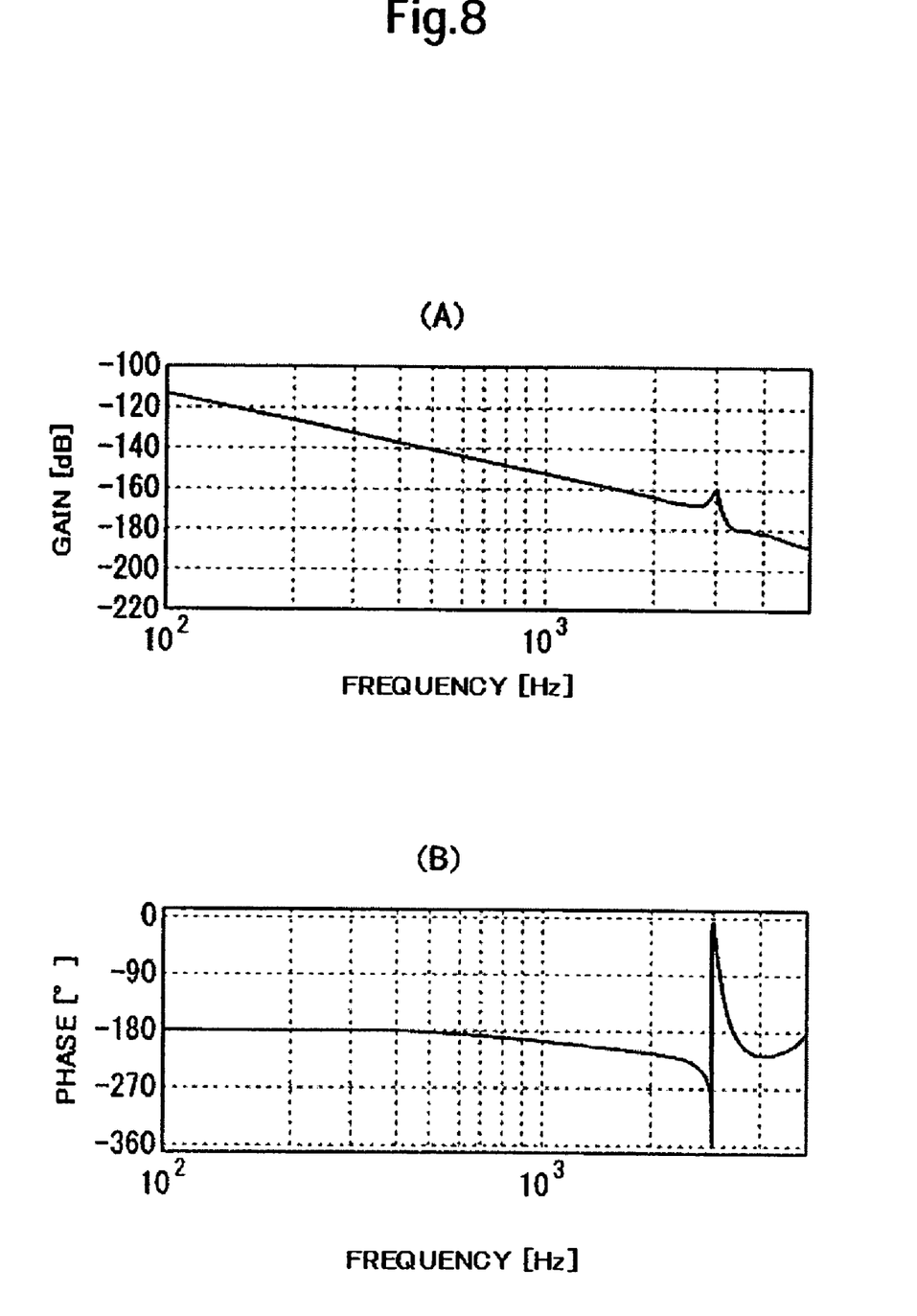
FIG. 8A and FIG. 8B are diagrams showing frequency response of a characteristic of the resonance filter and the controlled object in the embodiment, which have been coupled in series and discretized using the sampling time.
Figure 9:
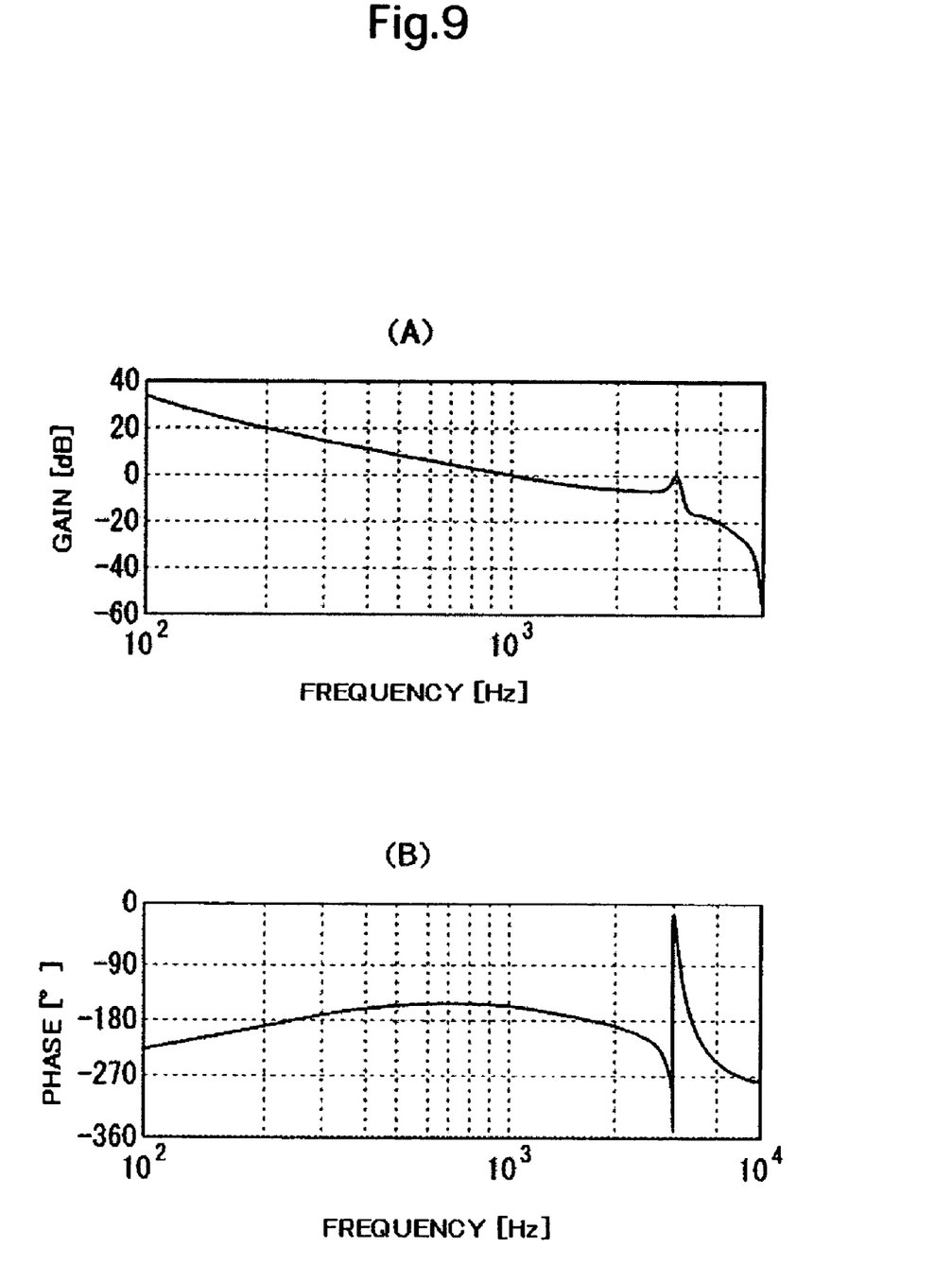
FIG. 9A and FIG. 9B are diagrams showing frequency response of an open-loop transfer characteristic in the embodiment.

Frequency response of the resonance filter Cm(z) 29 is shown in FIG. 7A to FIG. 7B. FIG. 7A is a gain characteristic in the response, and FIG. 7B is a phase characteristic in the response. Frequency response of the discretization characteristic P2(z) is shown in FIG. 8A to FIG. 8B. FIG. 8A is a gain characteristic in the response, and FIG. 8B is a phase characteristic in the response. Furthermore, frequency response of the open-loop transfer characteristic P2(z)·Cf(z) is shown in FIG. 9A to FIG. 9B. FIG. 9A is a gain characteristic in the response, and FIG. 9B is a phase characteristic in the response.

Figure 10:
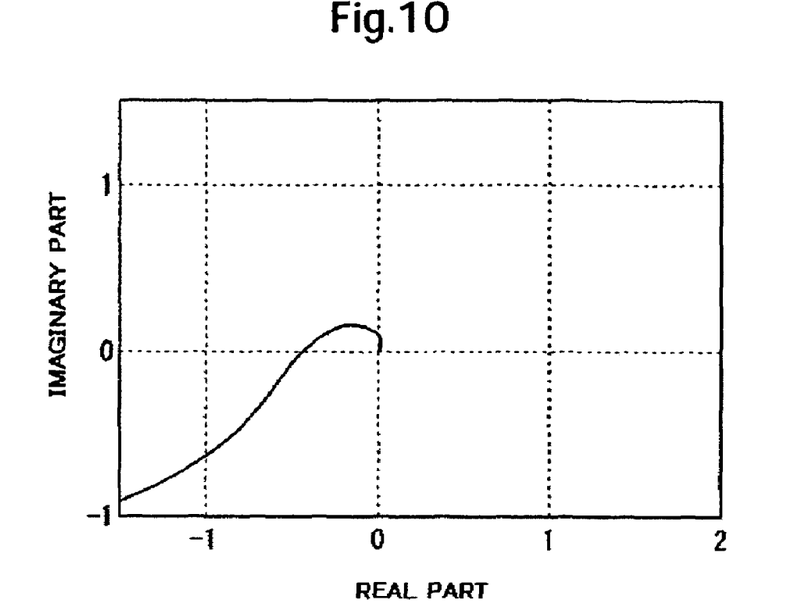
FIG. 10 is a diagram showing a Nyquist diagram of the open-loop transfer characteristic in the case that the invention is not used.
Figure 11:
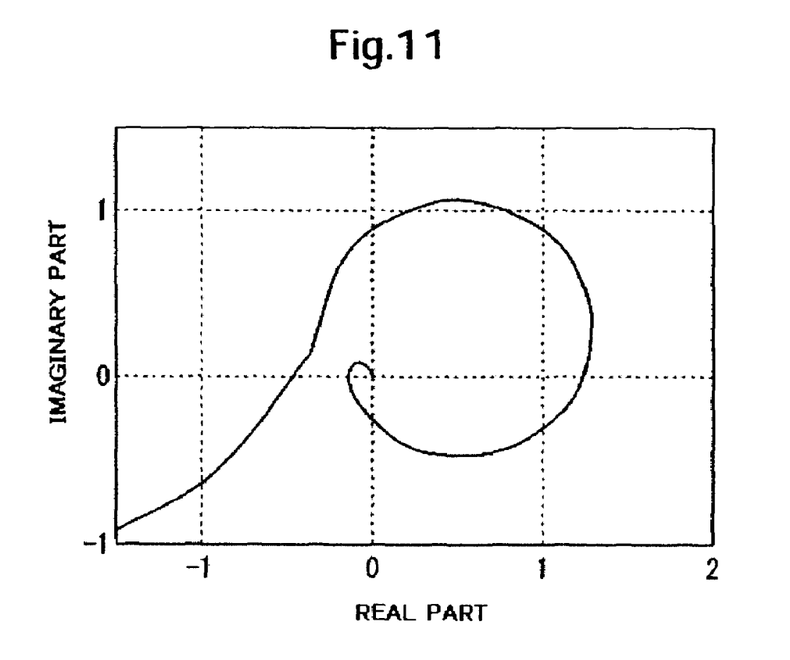
FIG. 11 is a diagram showing a Nyquist diagram of an open-loop transfer characteristic P in the embodiment.

Advantageous effects in the embodiment are described with reference to FIG. 10 and FIG. 11. FIG. 10 shows a Nyquist diagram in the case that the resonance filter Cm(z) is not used, and FIG. 11 shows a Nyquist diagram in the case that the resonance filter Cm(z) is used. It can be confirmed from the figures that a stable resonance characteristic that draws a circular locus in a direction away from the unstable point (−1, 0) at 3 kHz as the frequency involving aliasing is realized according to the embodiment.

Figure 12:
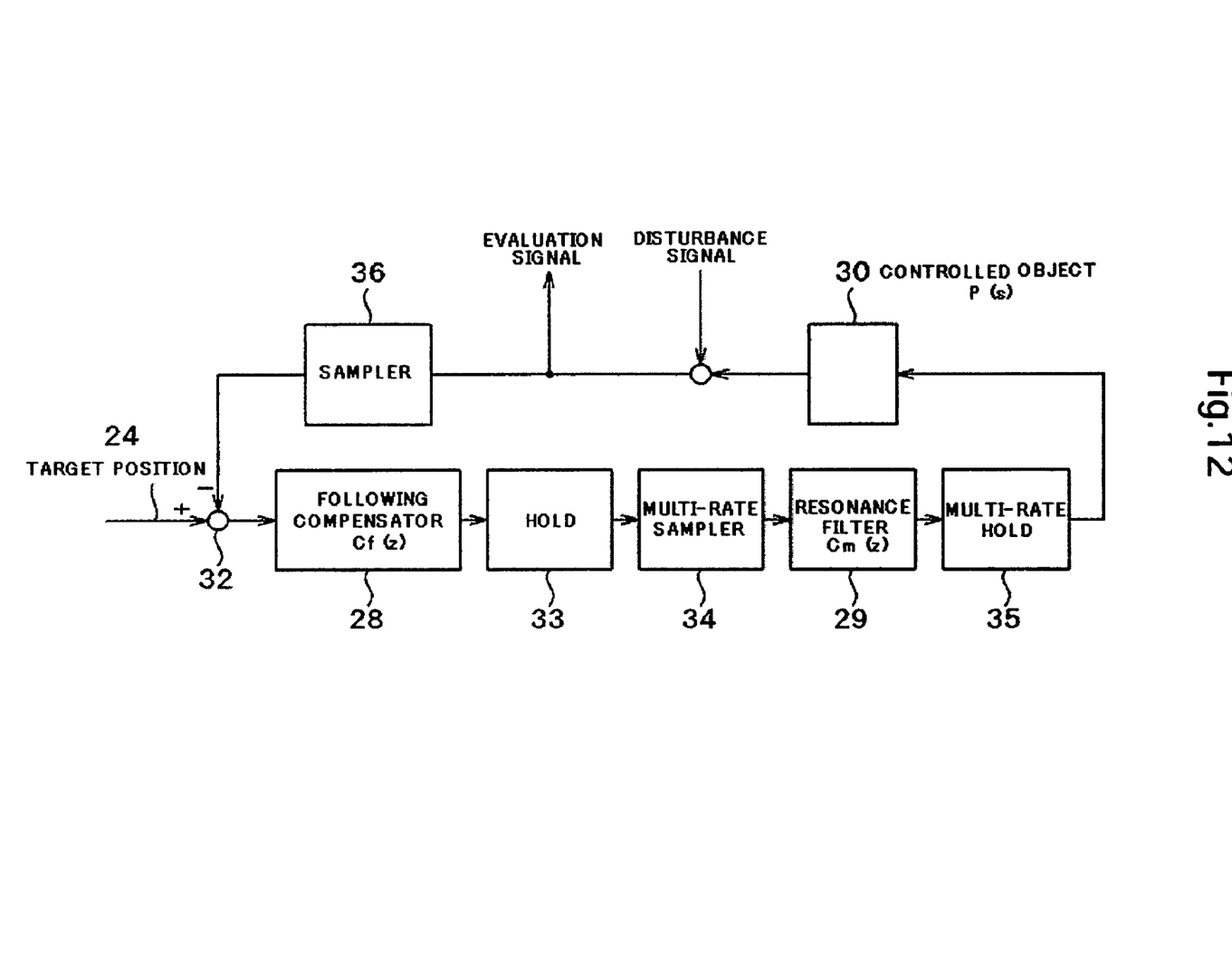
FIG. 12 is a block diagram showing a simulated control system in the embodiment.
Figure 13:
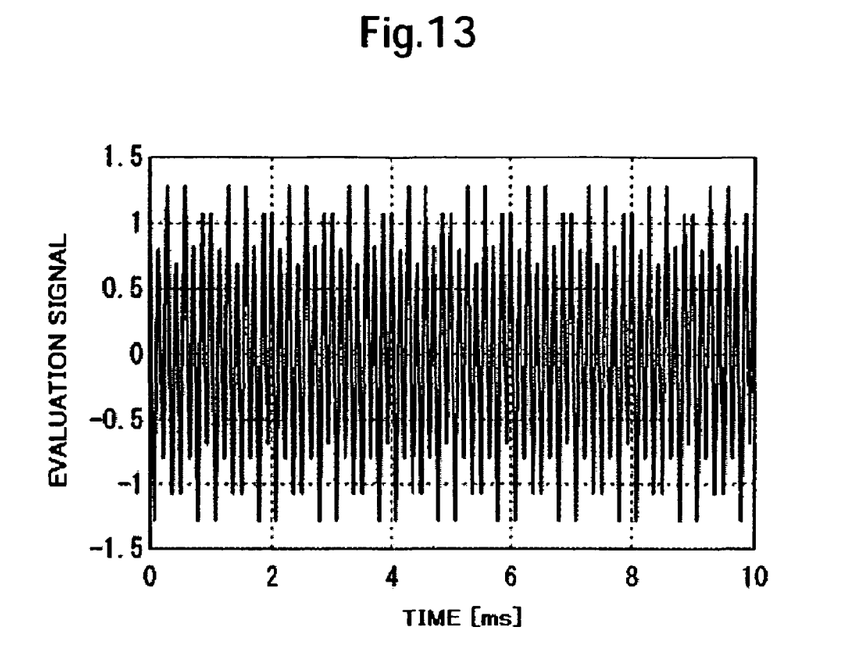
FIG. 13 is a diagram showing a simulation result of the control system in the case that the invention is not used.
Figure 14:
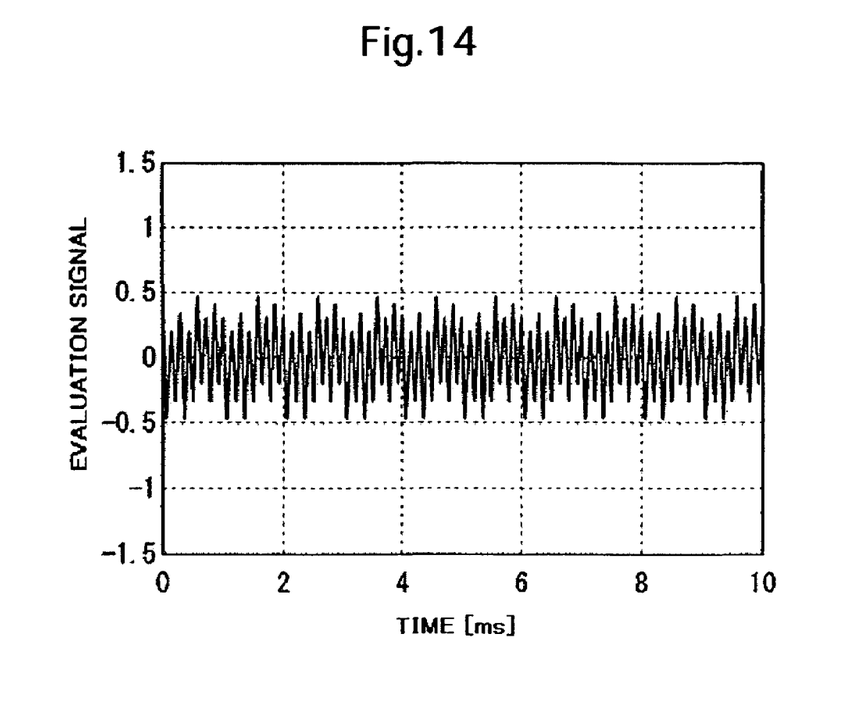
FIG. 14 is a diagram showing a simulation result of the control system in the embodiment.

Simulation was carried out, in which a disturbance signal was added between the controlled object P(s) and the sampler 36, and an input signal into the sampler 36 was set as an evaluation signal. By setting the input signal into the sampler as the evaluation signal, a head position in a continuous time system including response among sample dots can be evaluated. FIG. 12 shows a block diagram of a simulated control system. A disturbance signal is assumed to be a sine wave that is 100 in amplitude and 7 kHz in frequency. FIG. 13 shows time history response (steady state) of an evaluation signal in the case that the invention is not used. It can be confirmed from FIG. 13 that in the case that the embodiment is not used, an evaluation signal indicating a continuous time signal of a head position oscillates with amplitude about 1.3 times as large as that of the disturbance signal. FIG. 14 shows time history response (steady state) of an evaluation signal in the case that the embodiment is used. It can be confirmed from FIG. 14 that amplitude of the evaluation signal is advantageously reduced to about half the disturbance signal by using the embodiment.

While the resonance filter is a digital filter in the embodiment, it may be an analog filter in other embodiments.

Moreover, while the controlled object P(s) is in a single input and single output system in the embodiment, the invention can be also applied to a control system of a multi-input and multi-output system having a fine motion actuator and the like in addition to the VCM drive system. In that case, respective resonance filters may be coupled in series with respective transfer functions from input to output.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk device including,
a magnetic disk having a magnetic disk surface on which a position signal is written;
a magnetic head for reading the position signal written on the magnetic disk surface;
a sampler configured to sample the position signal read by the magnetic head at every sampling time;
an actuator that actuates the magnetic head; and
a controller that controls the magnetic head to be situated at a target position based on a given target position signal and the position signal sampled by the sampler,
wherein the controller has a resonance point at a frequency higher than Nyquist frequency as determined by the sampling time of the sampler, wherein a gain at the resonance point is increased relative to a gain at a frequency lower than the resonance point.

2. The magnetic disk device according to claim 1, wherein the controller realizes the resonance point using a multi-rate digital filter operating at a sampling time that is integral times less than the sampling time of the sampler.

3. The magnetic disk device according to claim 2, wherein the controller generates a differential signal between the target position signal and the position signal as a certain signal using a following compensator and inputs the signal into the multi-rate digital filter.

4. The magnetic disk device according to claim 2, wherein the following compensator provides a primary integral characteristic such that steady-state deviation does not occur even if external force is exerted on the controller; provides a primary phase-lead characteristic that realizes a phase margin of 20 to 40 degrees; and provides a gain characteristic such that the device has a gain margin of 3 to 10 dB, and crossover frequency at gain of 0 dB in an open-loop transfer characteristic of the controller has a set value.

5. The magnetic disk device according to claim 1, wherein an open-loop transfer characteristic of a control system expressed using the same sampling time as the sampling time of the sampler has a resonance characteristic at a frequency at which frequency of the resonance point is aliased by the sampler for sampling the position signal, and a vector locus drawn by the resonance characteristic is a locus in a direction away from an unstable point on a Nyquist diagram.

6. A method for positioning control of a magnetic head for reading a position signal on a magnetic disk surface of a magnetic disk device, the method comprising:
sampling the position signal read by the magnetic head at every sampling time of a sampler;
actuating the magnetic head; and
controlling, by a controller, the magnetic head to be situated at a target position based on a given target position signal and the position signal sampled,
wherein the controller has a resonance point at a frequency higher than Nyquist frequency as determined by the sampling time of the sampler, wherein a gain at the resonance point is increased relative to a gain at a frequency lower than the resonance point.

7. The method according to claim 6, further comprising:
realizing the resonance point using a multi-rate digital filter operating at a sampling time that is integral times less than the sampling time of the sampler.

8. The method according to claim 7, further comprising:
generating a differential signal between the target position signal and the position signal as a certain signal using a following compensator and inputs the signal into the multi-rate digital filter.

9. The method according to claim 7, further comprising:
providing a primary integral characteristic such that steady-state deviation does not occur even if external force is exerted on the controller; provides a primary phase-lead characteristic that realizes a phase margin of 20 to 40 degrees; and provides a gain characteristic such that the device has a gain margin of 3 to 10 dB, and crossover frequency at gain of 0 dB in an open-loop transfer characteristic of the controller has a set value.

10. The method according to claim 6,
wherein an open-loop transfer characteristic of a control system expressed using the same sampling time as the sampling time of the sampler has a resonance characteristic at a frequency at which frequency of the resonance point is aliased by the sampler for sampling the position signal, and a vector locus drawn by the resonance characteristic is a locus in a direction away from an unstable point on a Nyquist diagram.

* * * * *